US012366525B2

United States Patent
Kirshner et al.

(10) Patent No.: US 12,366,525 B2
(45) Date of Patent: Jul. 22, 2025

(54) PHASE RETRIEVAL

(71) Applicant: Applied Materials Israel Ltd., Rehovot (IL)

(72) Inventors: Benny Kirshner, Elkana (IL); Boris Golberg, Ashdod (IL)

(73) Assignee: Applied Materials Israel Ltd., Rehovot (IL)

( * ) Notice: Subject to any disclaimer, the term of this patent is extended or adjusted under 35 U.S.C. 154(b) by 316 days.

(21) Appl. No.: 17/972,339

(22) Filed: Oct. 24, 2022

(65) Prior Publication Data

US 2024/0133807 A1 Apr. 25, 2024
US 2024/0230530 A9 Jul. 11, 2024

(51) Int. Cl.
*G01N 21/47* (2006.01)
*G01N 21/95* (2006.01)

(52) U.S. Cl.
CPC ......... *G01N 21/47* (2013.01); *G01N 21/9501* (2013.01); *G01N 2201/0636* (2013.01)

(58) Field of Classification Search
CPC ............... G01N 21/47; G01N 21/9501; G01N 2201/0636
See application file for complete search history.

(56) References Cited

PUBLICATIONS

Thao et al., "Phase retrieval based on the vectorial model of point spread function", Journal of the Optical Society of America, vol. 37, No. 1, pp. 16-26, Jan. 2020. (Year: 2020).*

* cited by examiner

*Primary Examiner* — Thanh Luu
(74) *Attorney, Agent, or Firm* — Kilpatrick Townsend & Stockton LLP

(57) ABSTRACT

A method for phase retrieval, the method may include (a) obtaining multiple out-of-focus intensity images of one or more point spread function targets; wherein the out-of-focus intensity images are generated by based on residual collected light signals obtained by a residual collection channel of an optical unit having a numerical aperture that exceeds 0.8; and (b) calculating phase information, based on the multiple out-of-focus intensity images and on a vectorial model of the point spread function.

16 Claims, 3 Drawing Sheets

Obtaining multiple out-of-focus intensity images of one or more point spread function targets. The out-of-focus intensity images are generated based on residual collected light signals obtained by a residual collection channel of an optical unit having a numerical aperture that exceeds 0.8. 110

Illuminating the one or more points spread function targets with illumination. 111

Collecting scattered light signals – including collecting, by the residual collection channel, the residual collected light signals. 112

Passing a majority of a collected scattered light beam through an opening of an aperture mirror of a radiation distribution unit of the optical unit. 114

Reflecting a minor part of the collected scattered light beam by a reflecting region of the apertured mirror to provide the residual collected light signals. 115

Generating, detection signals that represent the residual collected light signals. 113

Applying a phase retrieval process based on a vectorial model of point spread function. 120

PHASE RETRIEVAL

STATEMENT AS TO RIGHTS TO INVENTIONS MADE UNDER FEDERALLY SPONSORED RESEARCH AND DEVELOPMENT

The project leading to this application has received funding from the ECSEL Joint Undertaking (JU) under grant agreement No. 826589 (MADEin4). The JU receives support from the European Union's Horizon 2020 research and innovation programme and Italy, Germany, Belgium, Sweden, Austria, Romania, Slovakia, France, Poland, Spain, Ireland. Switzerland, Israel.

BACKGROUND

Inspection systems may inspect a sample by illuminating a sample and converting, by light to electric signal converting (LESC) sensors, scattered light signals to electrical signals. A charged coupled device (CCD) sensor is an example of a LESC sensor.

Inspection systems that relay on LESC sensors are not able to detect a phase of the scattered light signals. The phase is the electric field phase of the illumination beam.

It may be highly beneficial to obtain phase information even when using LESC sensors—especially in high numerical aperture inspection systems.

SUMMARY

There may be provided a system, method and a non-transitory computer readable medium for phase reconstruction.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 1 is an example of a method;

DETAILED DESCRIPTION

Figure 2:
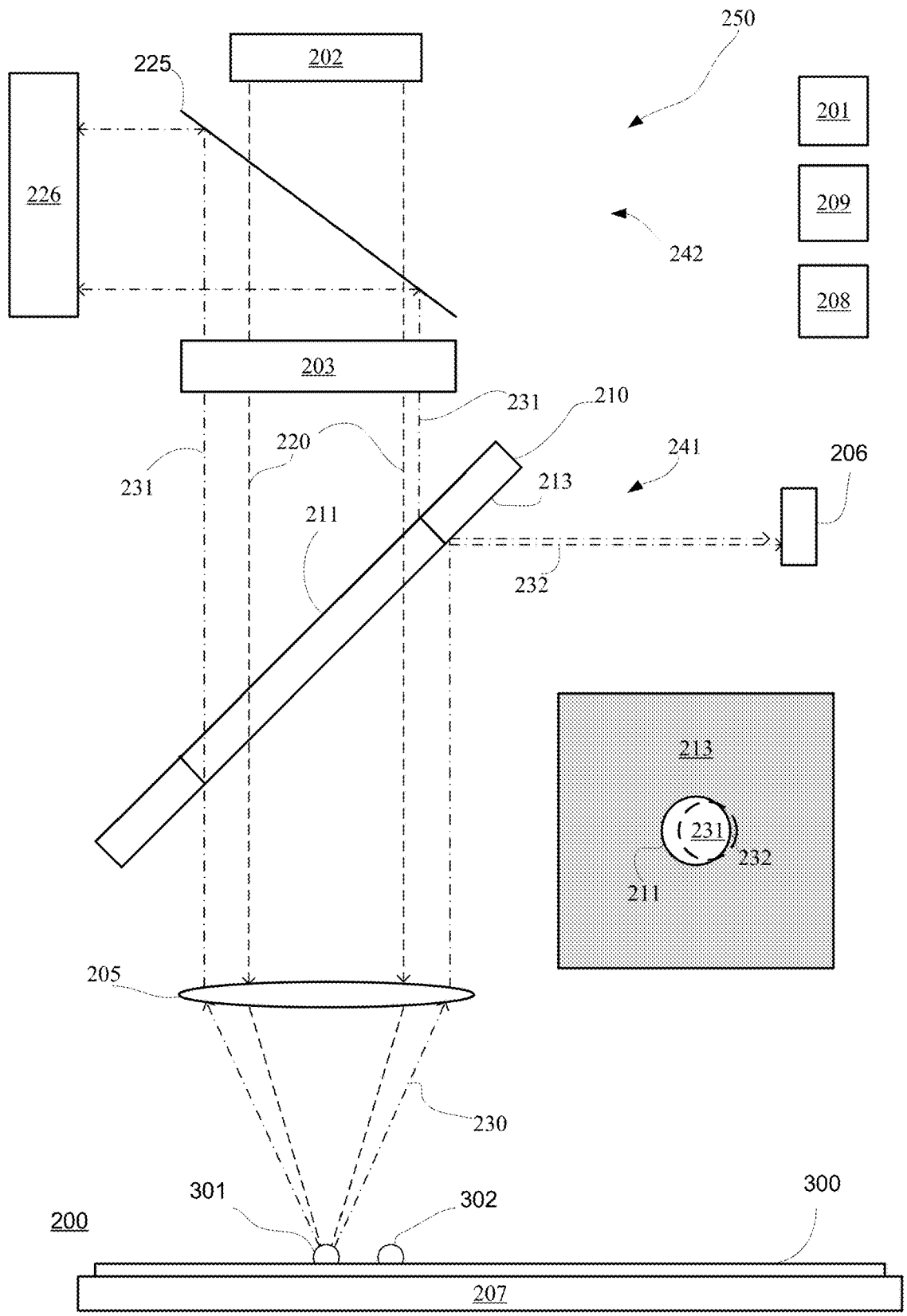
FIG. 2 is an example of a computerized system.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

The term "corresponding" when referring to different images means located at the same location in the different images—for example at a same combination of row value and column value.

The term "region" of a sample may be the entire sample or only one or more parts of the region. The sample may be a semiconductor wafer or another sample.

FIG. 1 illustrates a method 100 for phase retrieval that uses intensity images.

Method 100 may be executed by a computerized system. The computerized system may include an optical unit for generating multiple-out-of-focus intensity images or may not include the optical unit.

Method 100 may start by step 110 of obtaining multiple out-of-focus intensity images of one or more point spread function targets.

The obtaining may include receiving or generating or participating in a generating process. For example—step 110 may include receiving the multiple out-of-focus intensity images. Yet for another example—step 110 may include generating the multiple out-of-focus intensity images. Yet for a further example—step 110 may include executing only some of a process for generating the multiple out-of-focus intensity images.

The out-of-focus intensity images may be generated based on residual collected light signals obtained by a residual collection channel of an optical unit having a numerical aperture that exceeds 0.8—which can be regarded as a high numerical aperture optical unit.

The residual channel may not be the main collection channel of the optical unit. The main collection channel may be a bright field collection channel. The bright field collection unit may be regarded as the main collection channel as it receives the majority of the collected scattered light signals. The high numerical number of the optical unit is related to the bright field collection channel.

Step 110 may be followed by step 120 of calculating phase information, based on the multiple out-of-focus intensity images and on a vectorial model of the point spread function.

Step 120 may include applying a phase retrieval process based on a vectorial model of point spread function. An example of a phase retrieval process based on a vectorial model of point spread function is illustrated in "Phase retrieval process based on a vectorial model of point spread function" Thao, Nguyen Hieu; Soloviev, Oleg; and Verhaegen, Michel, Journal of the Optical Society of America A: Optics and Image Science, and Vision, 37(1), 16-26.

Referring back to step 110—step 110 may include step 111 of illuminating the one or more points spread function targets with illumination, step 112 of collecting scattered light signals—including collecting, by the residual collection channel, the residual collected light signals, and step 113 of generating, detection signals that represent the residual collected light signals.

Step 112 may include step 114 of passing a majority of a collected scattered light beam through an opening of an aperture mirror of a light distribution unit of the optical unit, and step 115 of reflecting a mirror part of the collected scattered light beam by a reflecting region of the apertured mirror to provide the residual collected light signals. The opening of the aperture mirror may be replaced by a window through which the radiation may propagate. Any reference to an opening should be applied mutatis mutandis to a window.

The center of the opening may be misaligned with an optical axis of the collected scattered light beam—and the misalignment may facilitate the impingement of the minor part of the collected scattered light beam by the reflecting region.

The radius of the opening may equal radius of the collected scattered light beam—or may differ from the radius of the collected scattered light beam.

At least some of the multiple out-of-focus intensity images may be obtained using one or more different conditions. For example—at least one of the following is true:

- At least two of the multiple out-of-focus intensity images are obtained at different out-of-focus conditions.
- Obtaining at least 3 multi height images, for example—covering a range of 1-2 Depth Of Focus (DOF) values (i.e −1,0 & 1 DOFs).
- Obtaining out-of-focus images with good contrast (for example above ten—after offset subtraction)
- At least two of the multiple out-of-focus intensity images are obtained at different illumination polarization conditions—for example using any combination of polarization elements—such as a half wave plate, a quarter wave plate, and the like.
- At least two of the multiple out-of-focus intensity images are obtained with different illumination intensity conditions—for example, illuminating with beams of different intensity.
- At least two of the multiple out-of-focus intensity images are obtained with different illumination beam shaping conditions—to provide illuminating beams of different cross sections.
- At least two of the multiple out-of-focus intensity images are obtained with different angles of illumination conditions—for example different impingement angles.
- At least two of the multiple out-of-focus intensity images are obtained with different apodization conditions.

Various steps of method 100 (for example steps 111-113) may be repeated at different conditions—for example different polarization conditions and/or different angle of illumination conditions and/or different beam shaping conditions and/or different apodization conditions. This may improve the accuracy of the phase retrieval. The changing of conditions improves the accuracy of the phase information and may also allow to characterize the optical unit in different conditions. For example—using multiple polarization states may enhance the information regarding system aberration. For example—averaging retrieved phase of different depended polarization states—thereby averaging phase retrieval 'noise' and improving the output accuracy.

FIG. 2 illustrates an example of a computerized system 200, and a sample 300 having a first point spread function target 301 and a second point spread function target 302.

There may be any number of point spread function targets—especially when the spatial 'cross talk' is small (i.e. the distance between two PSFs peaks well exceeds (for example of a factor of at least 5, 10, 20, 50, 100 and the like—from the PSF diffraction limit width. There may be any spatial relationship between the point spread function targets.

The computerized system 200 is configured to perform phase retrieval and includes a processing circuit 201 and a memory unit 209.

The processing circuit 201 is configured to (a) receive multiple out-of-focus intensity images of one or more point spread function targets; wherein the out-of-focus intensity images are generated by based on residual collected light signals obtained by a residual collection channel of an optical unit having a numerical aperture that exceeds 0.8; and (b) calculate phase information, based on the multiple out-of-focus intensity images and on a vectorial model of the point spread function.

FIG. 2 illustrates the computerized system 200 as including optical unit 250. The optical unit 250 includes a light distribution unit 210 that includes an apertured mirror having an opening 211.

An illuminating light beam 220 passes (for example in its entirety) through an opening 211 formed in an apertured mirror of the light distribution unit 210.

The collected scattered light beam 230 may be wider (when reaching the opening) than the illuminating light beam 220. The opening is shaped and sized to receive a majority 231 of a collected scattered light beam 230, while a minor part 232 of the collected scattered light beam impinges on a reflecting region 213 of the apertured mirror to provide the residual collected light signals.

In FIG. 2, a center of the opening 211 is misaligned with an optical axis (located at a center) of the collected scattered light beam 230. It should be noted that the scattered light may be evenly spread in respect to the azimuthal angle and therefore the fact that the collected scattered light isn't spherical symmetric is insignificant.

The radius of the opening may equal a radius of the collected scattered light beam—or may differ from the radius of the collected scattered light beam.

The radius of the opening may exceed a radius of the illuminating light beam 220.

FIG. 2 also illustrates the residual collection channel 241, the brightfield collection channel 242, objective lens 205, bright field sensor 226, light source 202, residual light sensor 206, communication module 208, and light controller 203.

The residual collection channel 241 spans between the reflecting region 213 and the residual light sensor 206.

The brightfield collection channel 242 may span between the opening 211 and the light source 202.

The objective lens 205, the light distribution unit 210 and the light controller 203 can be shared between a illumination channel of the optical unit and either one of the brightfield collection channel 242 and the residual collection channel 241.

The light controller 203 may be positioned outside the brightfield collection channel 242 (for example between the beam splitter 225 and the light source 202).

A light controller may be provided per each collection channel of the optical unit.

The light controller 203 may impact any parameter of the light that passes through the optical unit—for example polarity, angle of incidence, focus, beam profile, and the like.

The light controller 203 include at least one polarization element (for example a half wave plate, a quarter wave plate, and the like). Additionally of alternatively, the light controller 203 may include at least one defocus unit. Additionally of alternatively, the light controller 203 may include at least one beam shaper.

It should be noted that the focus of the out-of-focus images may be determined by a z-stage 207 configured to elevate or lower the sample 300.

At least one of the z-stage 207 or the light controller 203 may be configured to introduce different out-of-focus conditions during an acquisition of at least some of the multiple out-of-focus intensity images.

The optical unit may include an illumination module that is configured to change one or more illumination parameters during an acquisition of at least some of the multiple out-of-focus intensity images. The illumination module may be the light controller 203, or may be a combination of the light controller 203 and the light source 202.

Figure 3:
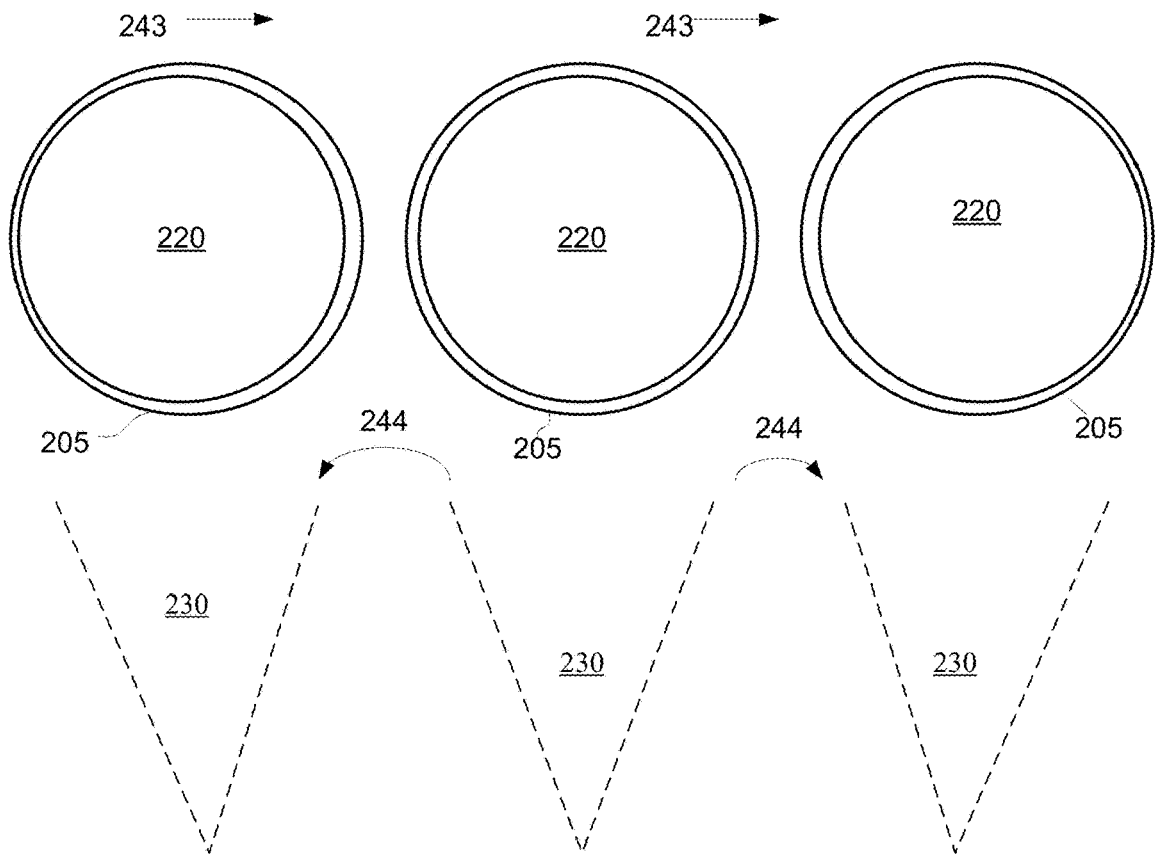
FIG. 3 is an example of a change in an illumination angle.

FIG. 3 illustrates the changing of an illumination angle. FIG. 3 illustrates the change of the illumination angle (also referred as impingement angle) of the illuminating light beam 220 by introducing a linear movement 243 between the illuminating light beam 220 and the objective lens—whereas the linear movement 243 is translated to a rotation 244 of the illuminating light beam 220 (when impinging on sample 300). The rotation is a liner movement of the incoming beam translated to the tile of the illumination beam.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. A method for phase retrieval, the method comprising:
   obtaining multiple out-of-focus intensity images of one or more point spread function targets; wherein the multiple out-of-focus intensity images are generated based on residual collected light signals obtained by a residual collection channel of an optical unit having a numerical aperture that exceeds 0.8;

passing a majority of a collected scattered light beam through an opening of an apertured mirror of a light distribution unit of the optical unit;

reflecting a minor part of the collected scattered light beam by a reflecting region of the apertured mirror to provide the residual collected light signals; and calculating phase information based on the multiple out-of-focus intensity images and on a vectorial model of a point spread function.

2. The method according to claim 1 wherein a center of the opening is misaligned with an optical axis of the collected scattered light beam.

3. The method according to claim 1 wherein a radius of the opening equals a radius of the collected scattered light beam.

4. The method according to claim 1, wherein at least two of the multiple out-of-focus intensity images are obtained at different out-of-focus conditions.

5. The method according to claim 1 wherein at least two of the multiple out-of-focus intensity images are obtained at different illumination polarization conditions.

6. The method according to claim 1 wherein at least two of the multiple out-of-focus intensity images are obtained with different angles of illumination conditions.

7. The method according to claim 1 wherein the one or more point spread function targets comprise two or more point spread function targets that are illuminated simultaneously.

8. The method according to claim 1 wherein the obtaining comprises illuminating the one or more point spread function targets with illumination, and generating, detection signals that represent the residual collected light signals obtained by the residual collection channel.

9. A method for phase retrieval, the method comprising:
obtaining multiple out-of-focus intensity images of one or more point spread function targets; wherein the multiple out-of-focus intensity images are generated based on residual collected light signals obtained by a residual collection channel of an optical unit having a numerical aperture that exceeds 0.8; and calculating phase information based on the multiple out-of-focus intensity images and on a vectorial model of a point spread function;

wherein at least two of the multiple out-of-focus intensity images are obtained with different illumination beam shaping conditions.

10. The method according to claim 9 wherein comprising:
passing a majority of a collected scattered light beam through a window of a mirror of a light distribution unit of the optical unit; and reflecting a minor part of the collected scattered light beam by a reflecting region of the mirror to provide the residual collected light signals.

11. A computerized system for phase retrieval, the computerized system comprising a processing circuitry, an optical unit, and a memory unit, wherein the processing circuitry is configured to:
receive multiple out-of-focus intensity images of one or more point spread function targets; wherein the multiple out-of-focus intensity images are generated by based on residual collected light signals obtained by a residual collection channel of the optical unit having a numerical aperture that exceeds 0.8; and calculate phase information, based on the multiple out-of-focus intensity images and on a vectorial model of a point spread function;

wherein the optical unit comprises a light distribution unit that comprises an apertured mirror having an opening, wherein the opening is shaped and sized to receive a majority of a collected scattered light beam, while a minor part of the collected scattered light beam impinges on a reflecting region of the apertured mirror to provide the residual collected light signals.

12. The computerized system according to claim 11, wherein a center of the opening is misaligned with an optical axis of the collected scattered light beam.

13. The computerized system according to claim 11, wherein a radius of the opening equals a radius of the collected scattered light beam.

14. The computerized system according to claim 11, further comprising an adjustable focus unit for introducing different out-of-focus conditions during an acquisition of at least some of the multiple out-of-focus intensity images.

15. A computerized system for phase retrieval, the computerized system comprising a processing circuitry, an optical unit, and a memory unit, wherein the processing circuitry is configured to:
receive multiple out-of-focus intensity images of one or more point spread function targets; wherein the multiple out-of-focus intensity images are generated by based on residual collected light signals obtained by a residual collection channel of the optical unit having a numerical aperture that exceeds 0.8; and calculate phase information, based on the multiple out-of-focus intensity images and on a vectorial model of a point spread function;

wherein the optical unit comprises an illumination module that is configured to change one or more illumination parameters during an acquisition of at least some of the multiple out-of-focus intensity images.

16. A non-transitory computer readable medium for phase retrieval, wherein the non-transitory computer readable medium stores instructions for:
obtaining multiple out-of-focus intensity images of one or more point spread function targets; wherein the out-of-focus intensity images are generated by based on residual collected light signals obtained by a residual collection channel of an optical unit having a numerical aperture that exceeds 0.8;

passing a majority of a collected scattered light beam through an opening of an apertured mirror of a light distribution unit of the optical unit;

reflecting a minor part of the collected scattered light beam by a reflecting region of the apertured mirror to provide the residual collected light signals; and calculating phase information, based on the multiple out-of-focus intensity images and on a vectorial model of a point spread function.

* * * * *